US010582796B1

(12) United States Patent
Burr

(10) Patent No.: US 10,582,796 B1
(45) Date of Patent: Mar. 10, 2020

(54) CURTAIN HOLDBACK ASSEMBLY

(71) Applicant: BURR DISTRIBUTION, LLC, North Attleboro, MA (US)

(72) Inventor: Derrek Burr, Attleboro, MA (US)

(73) Assignee: Burr Distribution, LLC, North Attleboro, MA (US)

( * ) Notice: Subject to any disclaimer, the term of this patent is extended or adjusted under 35 U.S.C. 154(b) by 0 days.

(21) Appl. No.: 15/990,779

(22) Filed: May 28, 2018

Related U.S. Application Data

(60) Provisional application No. 62/511,437, filed on May 26, 2017.

(51) Int. Cl.
F16M 11/00 (2006.01)
A47H 19/00 (2006.01)
F16B 45/00 (2006.01)

(52) U.S. Cl.
CPC ............. *A47H 19/00* (2013.01); *F16B 45/00* (2013.01)

(58) Field of Classification Search
CPC ........... A47H 13/14; A47H 19/00; A47H 1/42
See application file for complete search history.

(56) References Cited

U.S. PATENT DOCUMENTS

| D47,004 S | 2/1915 | Martin |
| D55,157 S | 5/1920 | Dubish |
| 1,525,895 A | 2/1925 | Sherwood |
| 1,980,918 A * | 11/1934 | Hudspeth ............... A47H 19/00 160/108 |
| D101,104 S | 9/1936 | Bushey et al. |
| 2,606,733 A * | 8/1952 | Krajewski ............... A47H 19/00 160/126 |
| 2,607,412 A * | 8/1952 | Vance .................... A47H 13/16 160/348 |
| 3,090,588 A * | 5/1963 | Monette ................. A47H 1/142 211/105.2 |
| 3,433,281 A * | 3/1969 | Lukashok .............. A47H 23/02 160/330 |
| D242,986 S | 1/1977 | Inglis |
| D251,180 S | 2/1979 | Mader et al. |
| D253,162 S | 10/1979 | Sheehan |
| D290,931 S | 7/1987 | Powell |
| 4,684,095 A | 8/1987 | Athey |
| 5,316,067 A * | 5/1994 | LeClaire ................ A47H 13/14 160/330 |
| 5,398,900 A | 3/1995 | Schober |
| D376,755 S | 12/1996 | Cox |
| D389,036 S | 1/1998 | Smiley et al. |
| D408,722 S | 4/1999 | Sartini |
| D420,567 S | 2/2000 | Laga et al. |

(Continued)

Primary Examiner — Amy J. Sterling
(74) Attorney, Agent, or Firm — John Brooks Law LLC; John J. Brooks, III

(57) ABSTRACT

A holdback assembly is provided comprising a mounting portion and a holdback portion. The mounting portion and the holdback portion are coupled and the mounting portion is configured to mount the holdback assembly to a structure while the holdback portion holds back a material or fabric from a position where it would otherwise fall under the force of gravity. In some embodiments, the holdback assembly is mounted to the side trim of a window and the holdback portion holds back a curtain from a portion of the window. In some embodiments, the holdback portion and the mounting portion are separable.

20 Claims, 7 Drawing Sheets

(56) References Cited

U.S. PATENT DOCUMENTS

| | | |
|---|---|---|
| D455,334 S | 4/2002 | Ivankovic |
| D464,013 S | 10/2002 | Adams et al. |
| D478,804 S | 8/2003 | Titus |
| D602,344 S | 10/2009 | Ollen |
| D611,328 S | 3/2010 | Hanley et al. |
| D658,043 S | 4/2012 | Burr |
| 8,231,093 B2 | 7/2012 | Tran |
| D678,754 S | 3/2013 | Burr |
| 8,418,975 B1 | 4/2013 | Burr |
| 2010/0224749 A1 | 9/2010 | Tran |

* cited by examiner

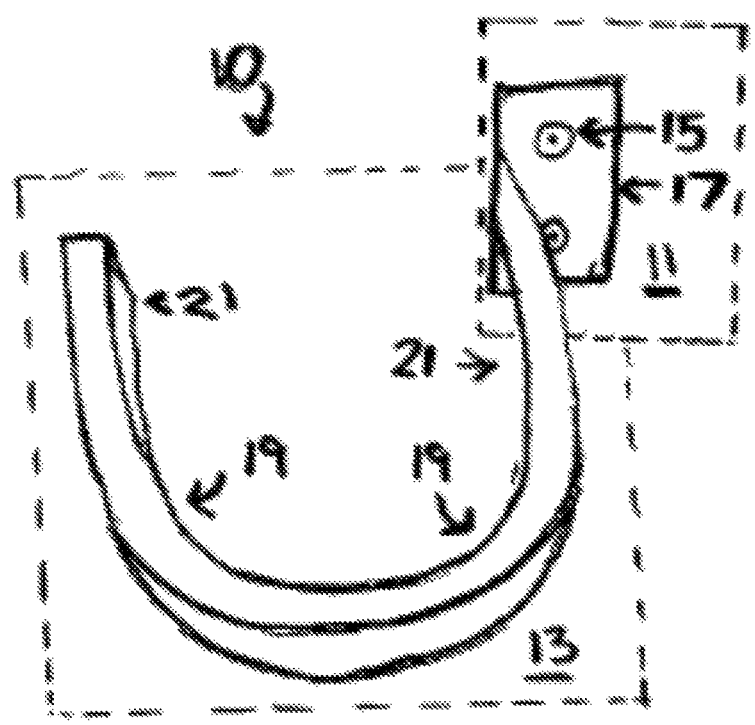
Fig 1
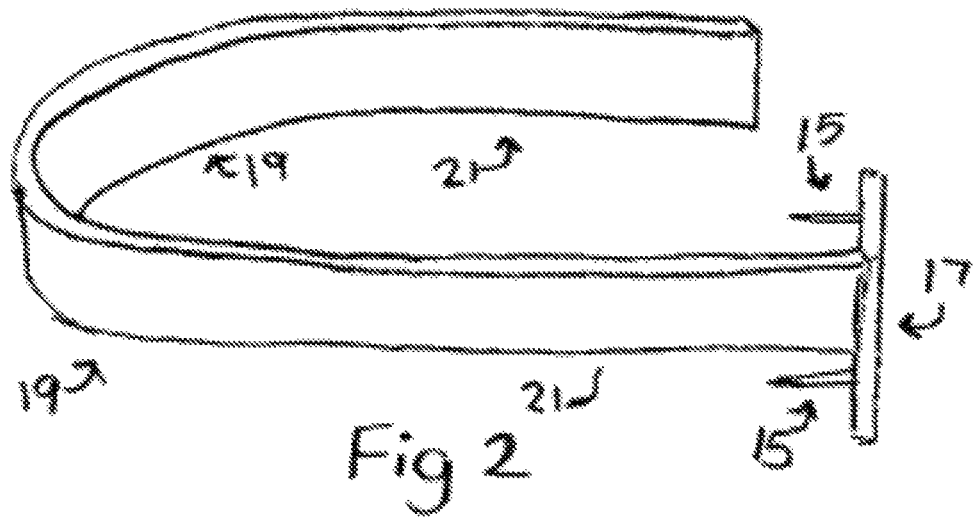
Fig 2

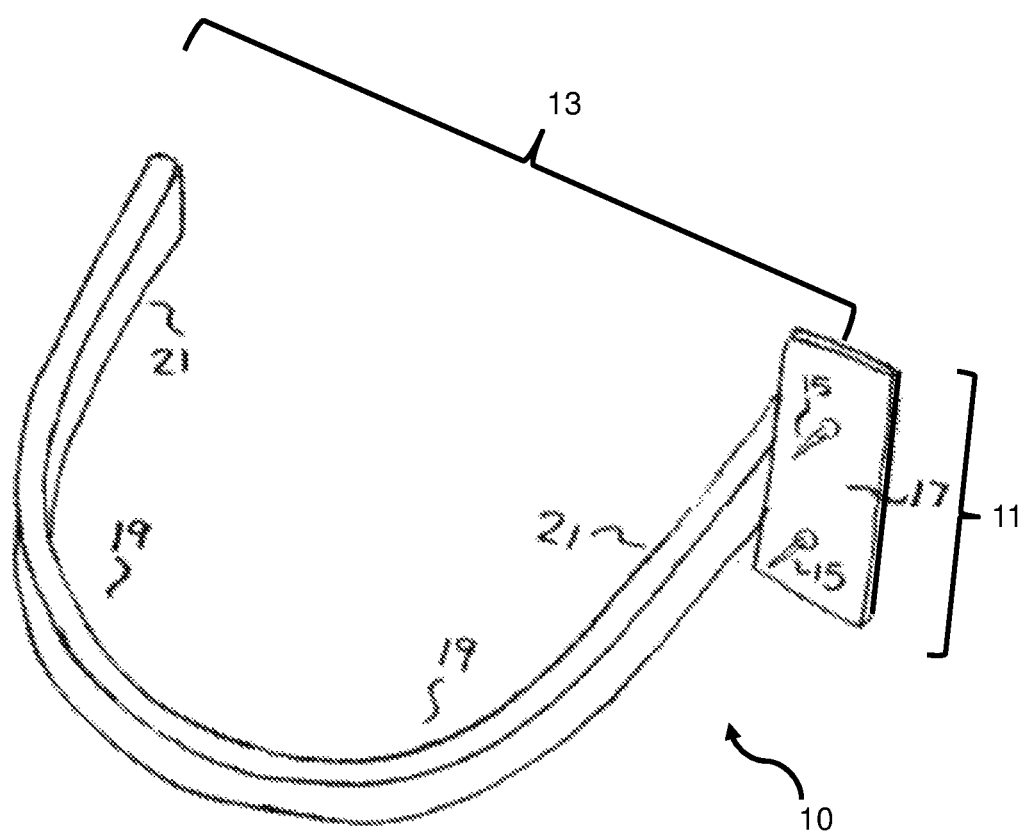
FIG. 3
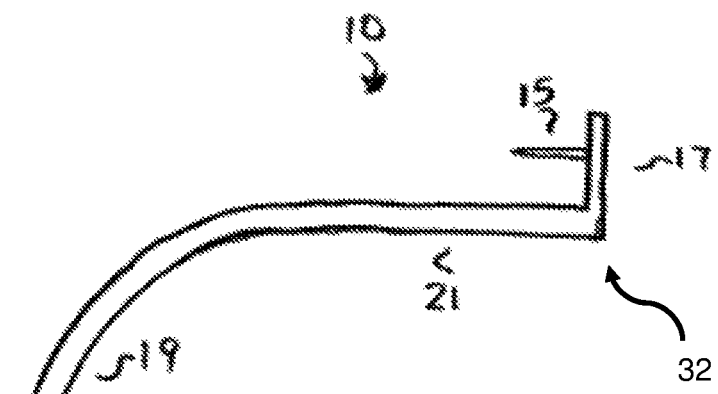
FIG. 4A

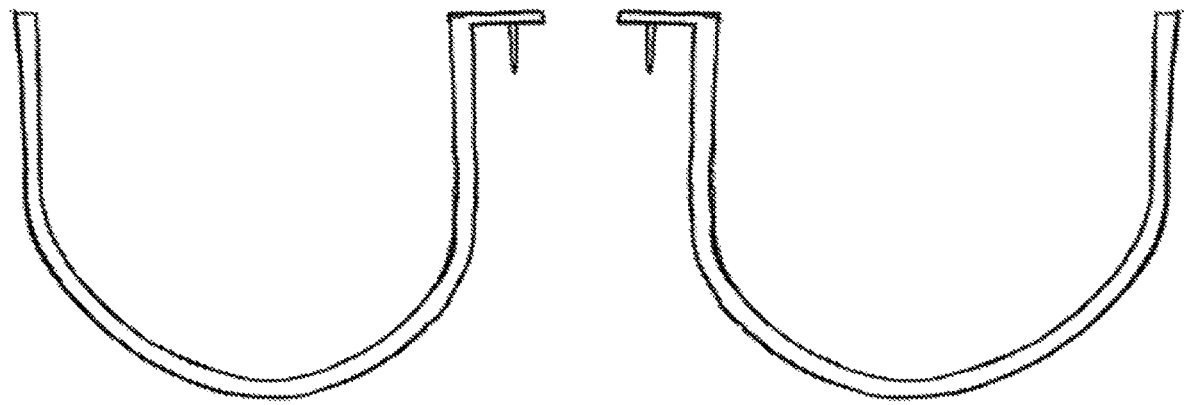
FIG. 4B
FIG. 4C
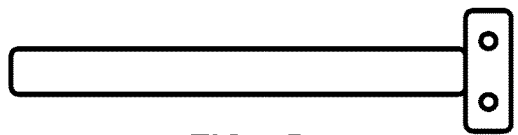
FIG. 4D
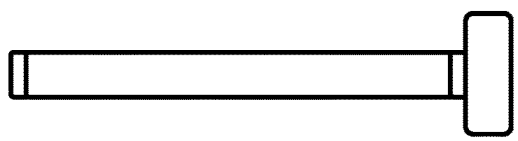
FIG. 4E
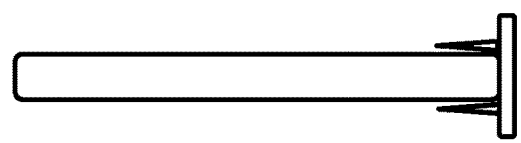
FIG. 4F
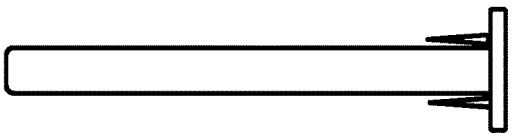
FIG. 4G

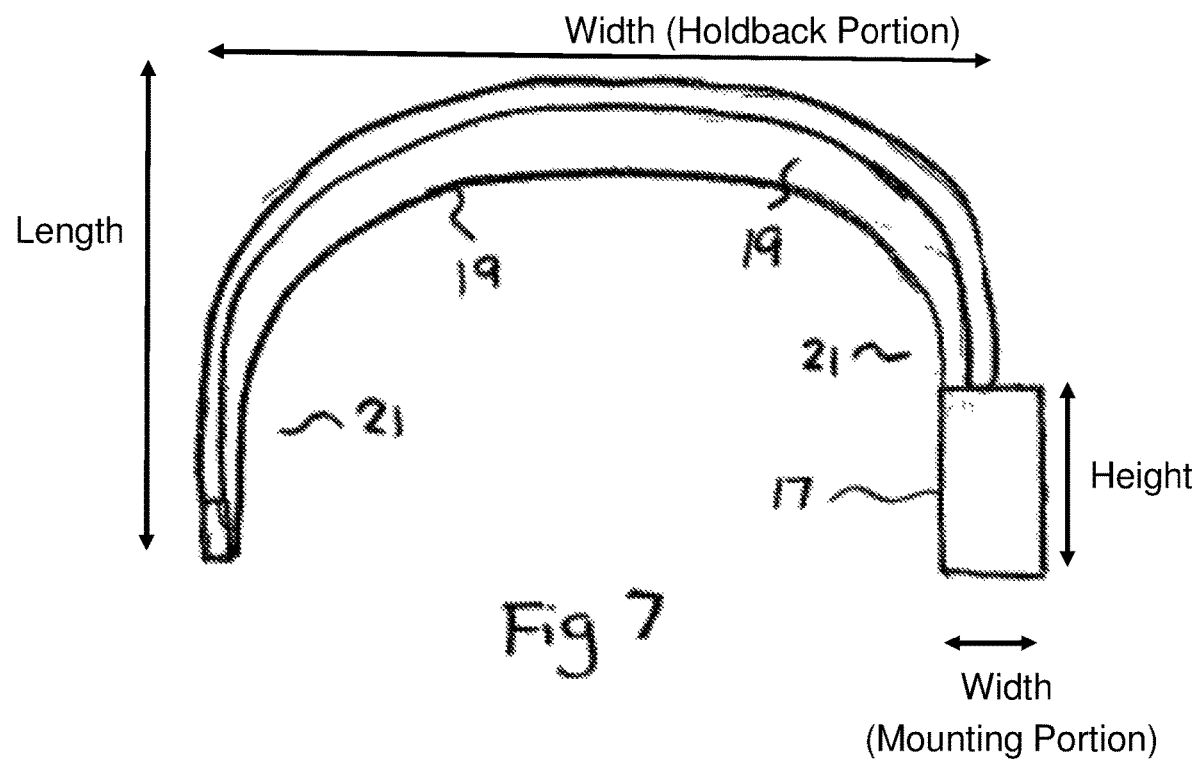
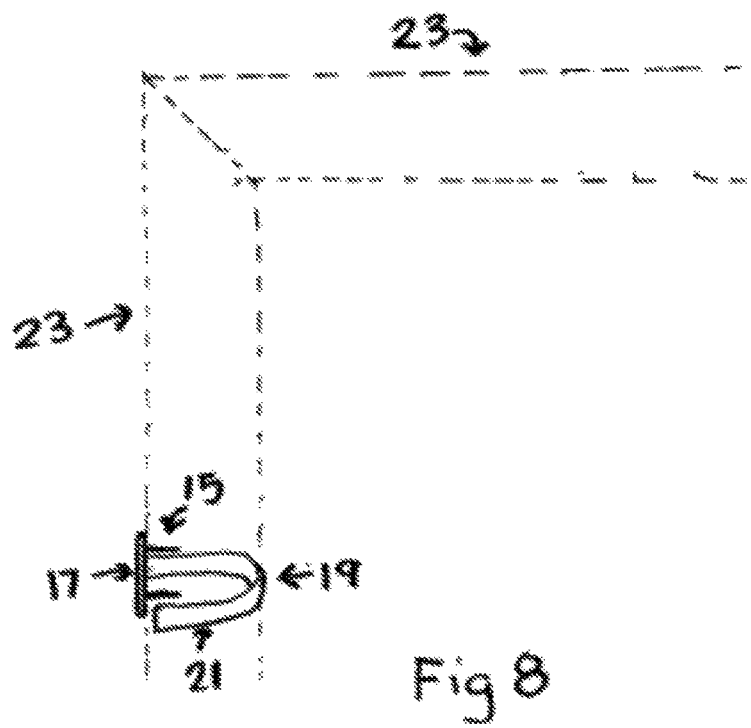

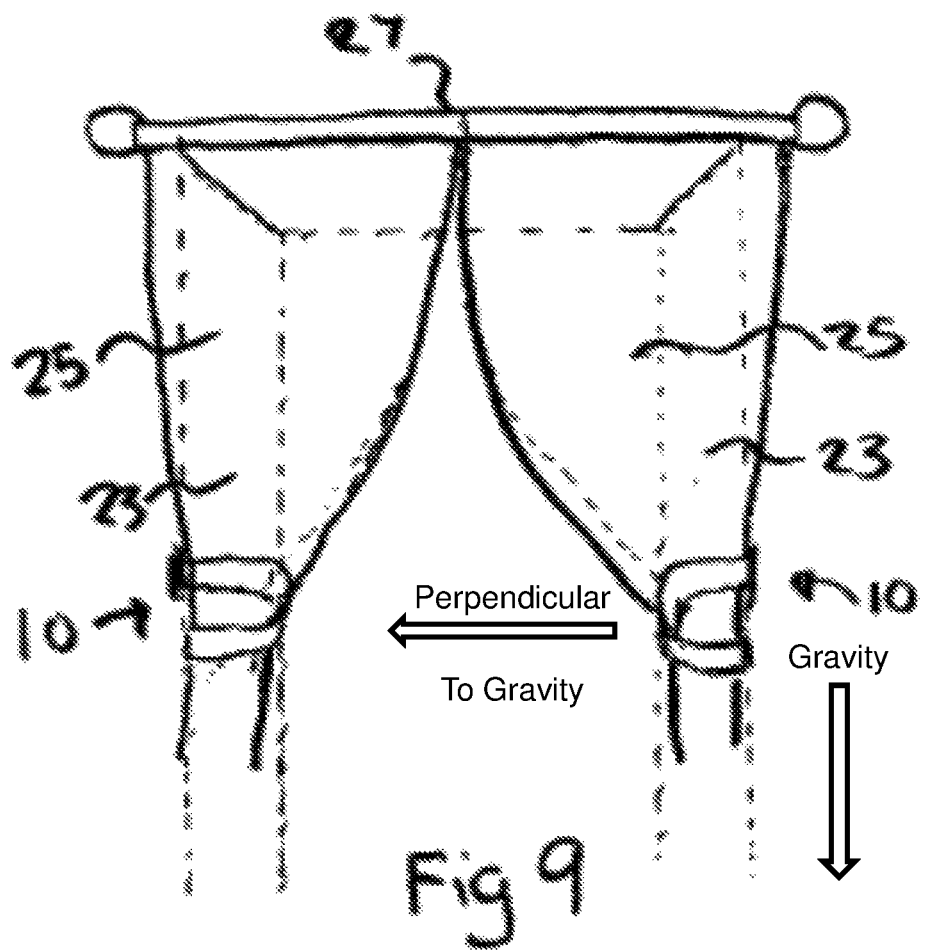

CURTAIN HOLDBACK ASSEMBLY

CROSS-REFERENCE TO RELATED APPLICATIONS

This application claims benefit of U.S. Pat. App. No. 62/511,437 filed on May 26, 2017, the entire contents of which are incorporated by reference.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The assembly relates to material holdbacks. More particularly, example embodiments of the present invention disclose a holdback assembly which is attachable to the side of the trim of a window without the use of mounting nails or screws. In some embodiments the holdback assembly will accommodate a curtain tieback/holdback or will itself hold back a curtain or a drapery from the opening of a window after the holdback assembly has been mounted on the trim of the window.

2. Background of the Invention

Holdbacks have long been used for holding back curtains or to securing curtain tiebacks on such surfaces such as walls, doors, windows, and ceilings and any trim, molding or casings around them. These holdbacks are offered in many different shapes and sizes and range from highly ornamental designs to simpler utilitarian designs. Often, these holdbacks comprise a hook-like portion in which the curtain rests, a ring through which the curtain passes and the holdback is be used to hold back the curtain from the opening of the window.

A problem in utilizing holdbacks of such known construction is that in order to mount the holdback in position, nails or screws are used to secure it to the wall or the window trim. This securing with nails or screws causes holes in the wall or trim. Additionally, when mounting to walls made of sheetrock or plaster, additional anchors and tools are usually required to properly mount the holdback. These additional tools and materials complicate the installation of the holdback. And after several repositionings of these holdbacks due to redecorating or different room inhabitants, the window may become honeycombed or even split or the wall may have so many holes it may not be able to secure a new nail or screw. These challenges make it increasingly difficult to mount new holdbacks as you change decorations or curtains.

Furthermore, many times the holdbacks are mounted directly to the wall or the front of the trim which does not provide the ideal "angle" to anchor the holdback against the force of the material it is holding back and can make it easier for the mounting to fail. For a traditional mount of the holdback, the orientation of the anchors are typically into the wall at a ninety-degree angle from primary force that will be put on the anchor. This angle reduces the effectiveness of the anchor to oppose the primary force put on the holdback from the material.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In some embodiments, a holdback assembly is provided that addresses the shortcomings in the prior art by providing a holdback assembly which, when used to support curtains and the like around wooden and other trim structures, does not require separate screws or nails for attachment to the window trim/molding. Rather, the holdback includes a plurality of integrally mounted pins which secure the holdback along the side of a trim structure, leaving any holes out of view when and if the bracket is subsequently removed.

In some embodiments, the holdback assembly comprises a mounting portion and a holdback portion. The mounting portion and the holdback portion are coupled and the mounting portion is configured to mount the holdback assembly to a structure while the holdback portion holds back a material or fabric from where it would otherwise fall under the force of gravity. In some embodiments, the holdback assembly is mounted to the side trim of a window and the holdback portion holds back a curtain from a portion of the window.

In some embodiments, the holdback assembly comprises a holdback portion coupled to a mounting portion. The holdback portion comprises an open end portion, a coupling portion and a bend portion. The mounting portion comprises a mounting plate having an inward facing surface, an open side surface and one or more engagement protrusions coupled to and extending generally perpendicular from the inward facing surface of the mounting plate.

The advantages and features of the present invention will become apparent to those skilled in the art when the following description is read in conjunction with the attached drawings and the appended claims.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which:

FIG. 1 shows an example embodiment of a holdback assembly illustrating a side perspective view of a mounting portion and a holdback portion;

FIG. 2 shows an example embodiment of a holdback assembly illustrating a rear perspective view;

FIG. 3 shows an example embodiment of a holdback assembly illustrating a side perspective view of a mounting portion and a holdback portion;

FIG. 4A shows an example embodiment of a holdback assembly illustrating a top view of a mounting portion and a holdback portion;

FIGS. 4B-4G illustrates the ornamental design of a holdback assembly wherein: FIG. 4B is a top view of the holdback assembly; FIG. 4C is a bottom view of the holdback assembly; FIG. 4D is a front view of the holdback assembly; FIG. 4E is a back view of the holdback assembly; FIG. 4F is a side view of the holdback assembly; and FIG. 4G is the other side view of the holdback assembly;

FIG. 7 shows an example embodiment of a holdback assembly illustrating another side perspective view;

FIG. 8 shows an example embodiment of a holdback assembly illustrating its mounting on a piece of side trim;

FIG. 9 shows an example embodiment of two holdback assemblies illustrating their mounting on the side trim of a window and holding back two curtain pieces;

Figure 5:
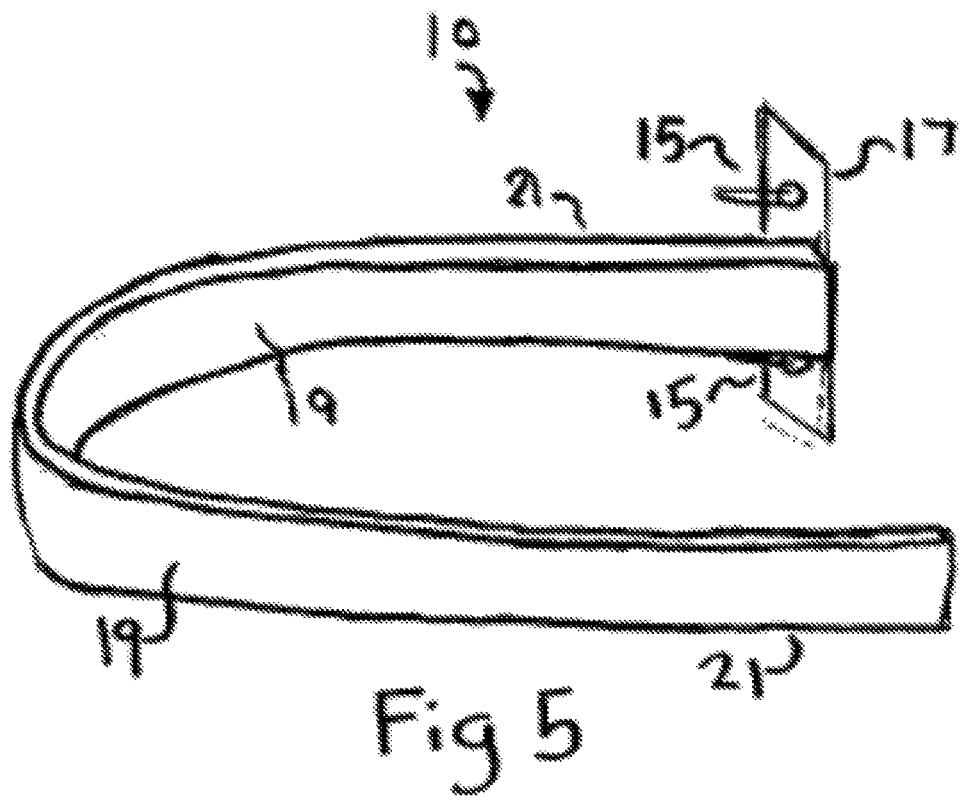
FIG. 5 shows an example embodiment of a holdback assembly illustrating a front perspective view.
Figure 6:
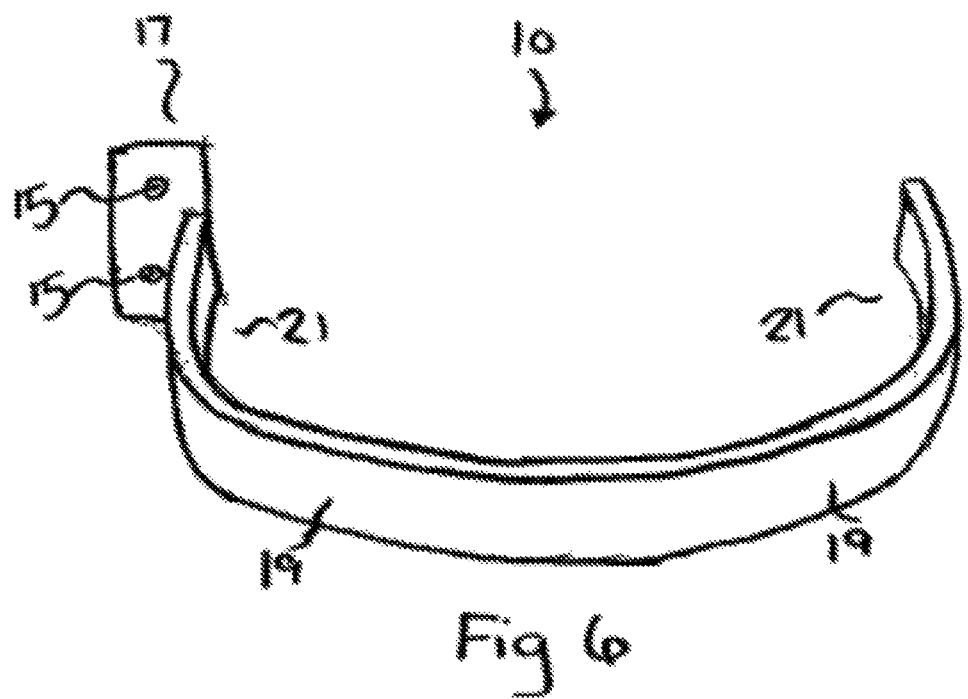
FIG. 6 shows an example embodiment of a holdback assembly illustrating a side perspective view.

The following detailed description is of the best currently contemplated modes of carrying out exemplary embodiments of the invention. The description is not to be taken in a limiting sense, but is made merely for the purpose of illustrating the general principles of the invention, since the scope of the invention is defined by the appended claims. Broadly, the scope of the present invention generally encompasses a holdback assembly utilizing a mounting plate and a holdback portion structure that provides increased load bearing capability and eliminates the need for screws or nails when mounting the assembly.

DETAILED DESCRIPTION OF THE INVENTION

Referring now to FIGS. 1-9, different views of a curtain holdback assembly 10 are shown according to example embodiments.

Example Embodiments of the Curtain Holdback Assembly:

As shown in the example embodiments of FIGS. 1 and 3, the holdback assembly 10 may include a mounting portion 11 and a holdback portion 13. In an example embodiment, the mounting portion 11 and the holdback portion 13 are coupled and the mounting portion 11 mounts the holdback assembly 10 to a mounting surface and the holdback portion 13 holds back a material or fabric from where it would otherwise fall under the force of gravity (see FIG. 9). In one example embodiment, as detailed further herein, the holdback assembly 10 is a curtain holdback assembly and the holdback assembly 10 is configured to be mounted to the side of a window trim with the mounting portion 11 and the holdback portion 13 coupled to hold the curtain material from the opening of the window.

As shown in the example embodiments of FIGS. 1-6, the mounting portion 11 may include a substantially flat mounting plate 17 coupled to the holdback portion 13 at a coupling joint 32. As shown, the side edge of the mounting portion 11 may be coupled to the coupling end of the holdback portion 13. One or more engagement protrusions 15, such as mounting pins or the like, may be attached or otherwise coupled on an inward facing side of the mounting plate 17. Inward facing describes the side of the mounting plate 11 that is placed against the mounting surface such as the trim around a window. The opposite side of the mounting plate 11 is the open side surface of the mounting plate. In some embodiments, the engagement protrusions 15 have their length extend perpendicular from the inward facing side of the mounting plate 11 whereby a force, such as from a hammer, against the open side surface of the mounting plate 11, can urge the engagement protrusions 15 to penetrate the mounting surface and secure the mounting portion to the mounting surface.

Referring to FIG. 7, although the dimension of the mounting portion 11 may be any size suitable for its purpose, some example embodiments of a mounting plate 11 may have dimensions in the range of about ¼ to 3 inches wide and about ½ to 12 inches in height and the engagement protrusions 15 may have any dimensions suitable to retain the holdback assembly in the mounting surface. In one example embodiment sized to be mounted on window trim, the mounting plate 11 dimensions may have a width of about ⅝ inches and a height of about 2 and ½ inches.

As shown in the example embodiments of FIGS. 1-7, the holdback portion 13 may include multiple portions that together form a shape to engage and hold back a fabric or material when the holdback assembly 10 is mounted. As shown in FIGS. 3 and 4, the holdback portion 13 has a hook shape with a straight portion extending from a coupling portion coupling the holdback portion to the mounting plate 17, one or more bend portions 19, another straight portion 21 leading to an open end portion 31. The bend portion along the holdback portion 13 may define various shapes and various diameters depending on the amount of curtain fabric intended to be held back by the holdback assembly 10. Although a hook shape is used for illustration purposes, it is understood that the bend portion and the holdback portion 13 may have any shape, to include ornamental shapes, that can appropriately hold a fabric or material when the holdback assembly 10 is mounted.

Referring to FIG. 7, although the dimension of the holdback portion 13 may be any size suitable for its purpose, some example embodiments of a holdback portion 13 may have dimensions in the range of about 1 to 12 inches in length and about 1 to 12 inches in width. In one example embodiment sized to hold back curtains around a window trim, the holdback portion 13 has a width of about 4 inches and a length of about 4 inches.

Regarding example cross-sectional dimensions of the holdback portion, the holdback portion may be made from a member with a circular, oval, rectangular, decorative or generally flat cross-sectional profile (perpendicular to its length). The member may be made from a solid or hollow material. The cross-sectional dimensions may be any size suitable for its purpose. Some example embodiments may have a cross-sectional width and height in the range of about ¼ to 4 inches and some decorative holdback portions may have dimensions greater than 4 inches. In one example embodiment sized to hold back curtains around a window trim, he holdback portion 13 is made from a round tubular member with a diameter of about ½ inches.

Referring to FIG. 4, although the dimension of the engagement protrusions 15 may be any size suitable for its purpose, some example embodiment of the engagement protrusions 15 may have length dimensions in the range of about ¼ to 4 inches in length. In one example embodiment sized to hold back curtains around a window trim, the engagement protrusions 15 have a length of about ⅝ or ¾ inches. The width of the engagement protrusions 15 may have any width suitable for their purpose. Generally, the width of the engagement protrusions 15 tapers to a sharpened end to help secure the mounting portion to the mounting surface. The width, or the width profile of the engagement protrusions may be similar to that of a nail. For example and not for limitation, the width profile may be similar to that of a small flat head nail, a finishing nail or a brad nail. In some embodiments, the width profile may have a broader base than a nail to allow for a more secure coupling of the engagement protrusions to the mounting portion. The alignment of the engagement protrusions on the inward facing surface of the mounting plate may be equidistant from the edge of the mounting plate that faces the wall when mounted on a window trim. For example, see the equidistant alignment in FIG. 11 along the dotted line. In some embodiments, the alignment of the engagement protrusion may also be offset from that edge. For example, when the mounting plate is used to secure the mounting plate to wooden window trim, when the engagement protrusions are offset, they will go into the wooden trim along different "grain lines" of the wood so that it is less likely to cause a split in the trim.

Figure 12:
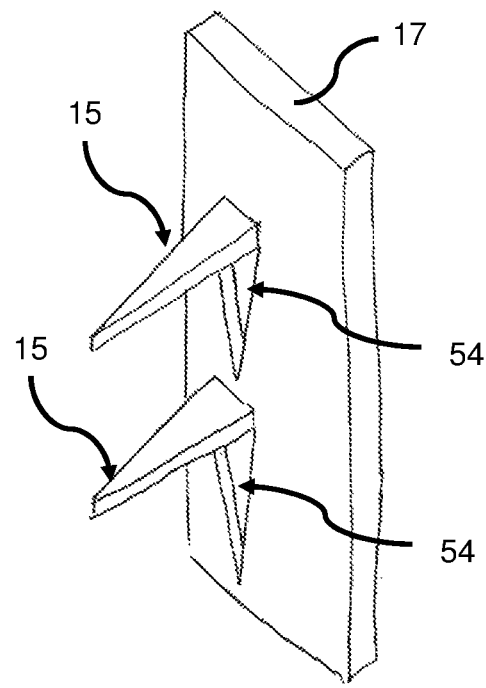
FIG. 12 shows an example embodiment of a mounting plate comprising two engagement protrusions punched out of the mounting plate.

Referring to FIG. 12, in some embodiments, the engagement protrusions may be "punched out" from the mounting portion and have a width profile of a triangle in one width dimension and a flat width profile in a perpendicular width dimension. In the embodiment shown, the engagement protrusions 15 are punched out from the mounting plate 17 and create the punch holes 54 shown.

The mounting portion 11 and the holdback portion 13 may be coupled in a configuration such that when the flat portion of the mounting plate 17 is positioned against a mounting surface, such as the side of a window molding or a trim, the holdback portion 13 extends generally horizontally with the open end portion of the holdback portion facing generally in the same direction as the open surface of the mounting plate 17. Since the closed end (bend portion) of the holdback portion will retain the fabric or material, an applied force will be placed on the holdback assembly 10. A major component of the applied force is generally perpendicular to the force of gravity and the engagement protrusions. By having the closed end generally positioned in the same direction as the inside surface of the mounting portion and the mounting surface, the applied force will further urge the engagement protrusions to penetrate the mounting surface and provide for a more secure mounting of the holdback assembly to the mounting surface. In some embodiments, the engagement protrusions are configured to be mounted generally perpendicular to the force of gravity and the engagement protrusions are configured to secure the holdback assembly and offset forces applied to the holdback portion directionally ranging from (i) a direction perpendicular to the force of gravity to (ii) the direction of the force of gravity.

Although the coupling of the holdback portion 13 and the mounting portion 11 may be configured in any manner that allows for the holdback assembly 10 to function properly, the coupling in one example embodiment to hold back curtains around a window trim, the coupling is a rigid coupling such as a weld of two pieces or a bend in a continuous material such that the external edge of the coupling joint is flush.

Figure 10:
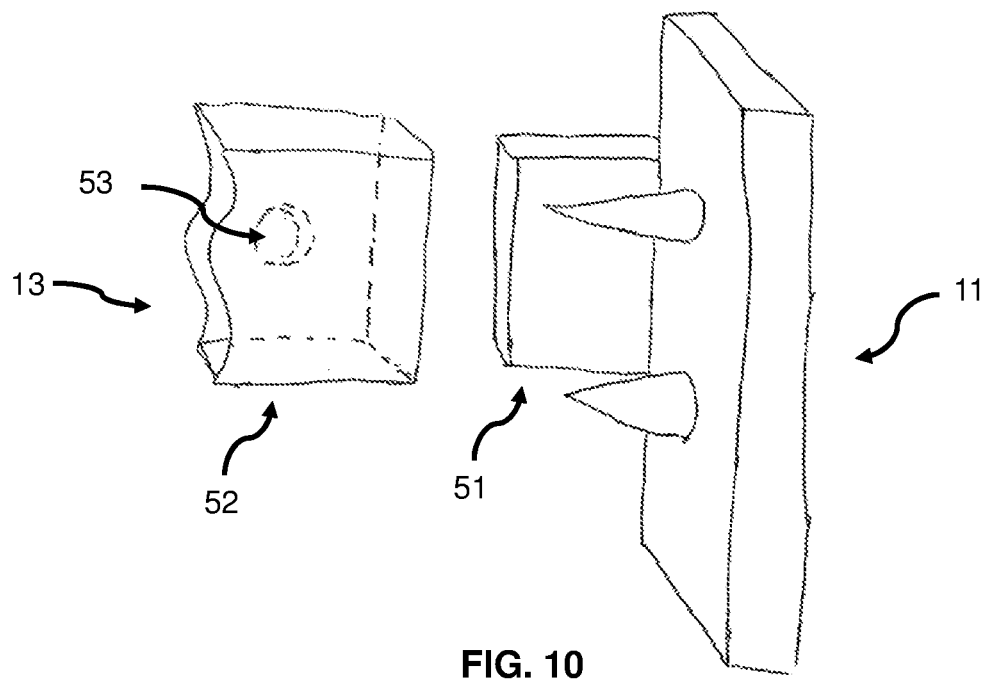
FIG. 10 shows a partially exploded view of an example embodiment of a coupling mechanism to removably couple a holdback portion and a mounting portion.

Referring to FIG. 10, in some embodiments, the holdback portion 13 and the mounting portion 11 may also be separable portions that are coupled with a coupling mechanism. For example and not for limitation, the mounting portion 11 may have a coupling protrusion 51 that mates with a coupling recess (e.g., a hollow portion of holdback portion) in the holdback portion 13 to couple the two portions together. In some embodiments, the coupling mechanism may be screws, mating recesses, clips, nails, adhesives or any other devices that function to couple the two portions together. In the embodiment shown, the coupling protrusion 51 mates within a hollow portion of the holdback portion and a screw is threaded into a threaded hole 53 whereby when the screw is tightened into the threaded hole 53 and the holdback portion 13 is securely coupled to the mounting portion 11.

Figure 11:
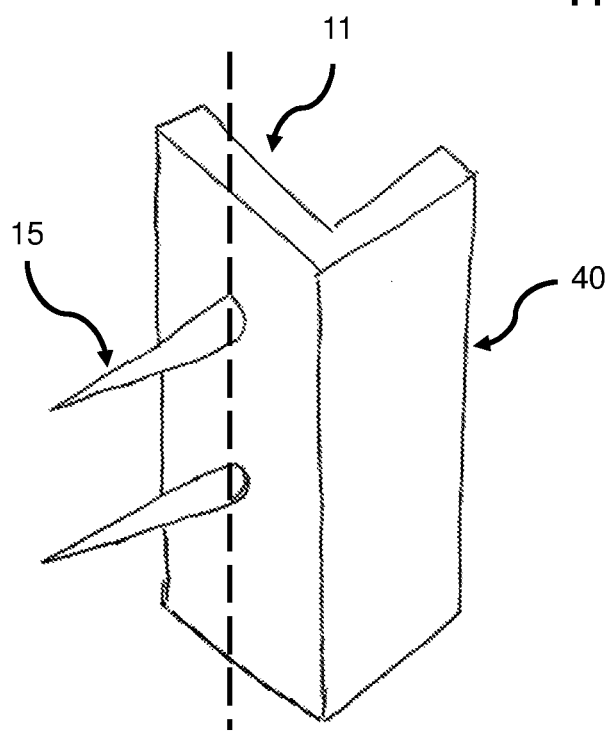
FIG. 11 shows an example embodiment of a mounting portion including a support portion.

Referring to FIG. 11, in some embodiments, the mounting portion may further comprise a support portion 40. In some embodiments, the support portion 40 generally provides further support for the holdback assembly when it is mounted on the mounting surface. The support portion 40 generally extends perpendicular to the open side surface of the mounting portion 11 and away from engagement protrusions 15 and the mounting surface. When the mounting portion 11 is secured to the mounting surface, the support portion 40 generally rests against the surface of the wall and helps keep the engagement protrusions 15 aligned with the mounting surface. The support portion 40 may be a single portion as shown in FIG. 11 or it may comprise multiple prongs extending from the mounting portion.

The holdback assembly 10 may be made from any rigid material such as plastic, wood, metal or some combination of these materials. In one embodiment, the holdback assembly 10 is made of sheet metal by general metal fabrication processes, for example, stamping, laser cutting, bending and spot welding.

Example Embodiments of the Curtain Holdback Assembly in Operation:

Operationally, the holdback assembly 10 generally functions by mounting the mounting portion 11 onto a mounting surface by having the protrusions 15 penetrate the mounting surface whereby the coupled holdback portion 13 is secured and can hold back a fabric or material in a position relative to the mounting surface.

For purposes of further illustrating the operation of one embodiment of a holdback assembly 10, and not for limitation, the operation of a holdback assembly 10 for holding back window curtains is summarized as shown in FIGS. 1-12 and as mounted in FIGS. 8-9. For example, the holdback assembly 10 may be a curtain holdback assembly 10 to be mounted on the side trim of a window to hold the curtain away from and to the side of the window. In this example embodiment, the holdback portion 13 is rigidly coupled to the mounting portion 11 and the protrusions 15 extend from the surface of the inward facing side of the mounting plate 17. The open side of the mounting plate 17 and the open end of the holdback portion 13 face towards the outside of the window trim.

In this embodiment, the inward facing side of the mounting plate 17 is positioned against the outer side of the window trim (away from the opening) where it is to be mounted. The mounting plate 17 is tapped with a hammer or other tool so that the protrusions 15 penetrate the side of the trim and secure the curtain holdback assembly 10 to the trim.

In some embodiments where the height of the mounting plate is greater than the height of the holdback portion, this additional height dimension provides an additional surface that can be tapped with the hammer to secure the holdback assembly to the trim. This additional surface may be helpful if the holdback portion extends beyond the plane of the open side surface of the mounting plate.

As mounted, the curtain can be bunched and put through the open end of the holdback portion 13 such that a portion of the curtain is held back from the window. If desired, another curtain holdback assembly 10 can similarly be mounted on the other side trim of the window.

FIGS. 8 and 9 show embodiments of a curtain holdback assembly 10 as mounted consistent with the description above.

For embodiments of the holdback assembly where the holdback portion and the mounting portion are separable, the mounting portion may be mounted first and the holdback portion may be secured later to the mounting portion and the mounting surface with the coupling mechanism.

Utilizing the holdback assembly and mounting in this manner, the holes caused by the protrusions are on the side of the trim and are less visible when the assembly is moved or removed.

Additionally, utilizing the holdback assembly and mounting in this manner increases the load bearing capability of the holdback assembly because the elements resisting the force of the curtains are anchored generally in parallel with the force rather than perpendicular with most mounting methods. For example, when screws are used to mount prior art holdback assemblies to the wall, the screws are typically drilled perpendicular to the wall. In this position, the force from the holdback assembly is usually at a right angle to the screw acting as the anchor. The mounting angle of the protrusions, into the side of a window trim, creates a much better angle to resist being pulled out as compared to the ninety-degree angle positioning of many prior art mounts.

Although this invention has been described in the above forms with a certain degree of particularity, it is understood that the foregoing is considered as illustrative only of example embodiments and principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A holdback assembly comprising:
a holdback portion;
the holdback portion comprising an open end portion, a coupling portion and a bend portion;
a mounting portion coupled to the holdback portion;
the mounting portion comprises a mounting plate having an inward facing surface, an open side surface and one or more engagement protrusions coupled to and extending generally perpendicular from the inward facing surface of the mounting plate; and
the inward facing surface of the mounting plate oriented substantially orthogonal to a direction of an extension of the holdback portion; and
the inward facing surface is configured to engage a mounting surface whereby the engagement of the inward facing surface with the mounting surface provides a compressive force to counter a force component applied to the holdback portion of the holdback assembly in the direction of the extension of the holdback portion.

2. The holdback assembly of claim 1 wherein the one or more engagement protrusions are sharpened protrusions configured to penetrate a mounting surface of a structure and secure the holdback assembly to the structure.

3. The holdback assembly of claim 2 wherein:
the structure is a side trim of a window;
the mounting surface is the outside side surface of the side trim of the window;
the one or more engagement protrusions extend generally perpendicular from the inward facing surface of the mounting plate;
whereby the holdback assembly can be mounted on the mounting surface without the use of nails; and
whereby the force component is applied by a curtain being held back from covering the window.

4. The holdback assembly of claim 1 wherein:
the mounting portion is coupled to the bend portion of the holdback portion with a single bend; and
the extension of the holdback portion generally extends parallel to a length of the engagement protrusions.

5. The holdback assembly of claim 1 wherein the engagement protrusions are configured to be mounted generally perpendicular to the force of gravity and the engagement protrusions are configured to offset forces applied to the holdback portion from a material retained by the holdback assembly.

6. The holdback assembly of claim 1 wherein the engagement protrusions are configured to be mounted generally perpendicular to the force of gravity and the engagement protrusions are configured to offset forces applied to the holdback portion directionally ranging from (i) a direction perpendicular to the force of gravity to (ii) the direction of the force of gravity.

7. The holdback assembly of claim 1 wherein the mounting plate and holdback portion are manufactured from one unitary member.

8. The holdback assembly of claim 1 wherein the mounting portion and holdback portion are coupled with a weld.

9. The holdback assembly of claim 1 wherein the mounting portion and holdback portion are coupled with a separable coupling mechanism.

10. The holdback assembly of claim 1 wherein the engagement protrusions comprise at least two sharpened protrusions coupled to and extending perpendicular from the inward facing surface of the mounting portion.

11. A holdback assembly comprising:
a holdback portion comprising an open end portion, a coupling portion and a bend portion;
a mounting portion comprises a mounting plate having an inward facing surface, an open side surface and one or more engagement protrusions coupled to and extending generally perpendicular from the inward facing surface of the mounting plate;
the mounting plate coupled to the bend portion of the holdback portion by a single angular bend; and
the inward facing surface of the mounting plate oriented substantially orthogonal to a direction of an extension of the holdback portion.

12. The holdback assembly of claim 11 wherein the mounting plate and holdback portion are manufactured from one unitary member.

13. The holdback assembly of claim 11 wherein the mounting plate and holdback portion are coupled with a weld.

14. The holdback assembly of claim 1 wherein the inward facing surface and the one or more engagement protrusions are configured to penetrate an outside side surface of a window trim as a mounting surface of a structure and secure the holdback assembly to the structure.

15. The holdback assembly of claim 1 wherein the one or more engagement protrusions are separable from the mounting plate.

16. The holdback assembly of claim 1 wherein:
the one or more engagement protrusions are separable from the mounting plate; and
the one or more engagement protrusions and the mounting plate are configured to be coupled when the holdback assembly is secured to a mounting surface of a structure.

17. The holdback assembly of claim 11 wherein the inward facing surface and the one or more engagement protrusions are configured to penetrate an outside side surface of a window trim as a mounting surface of a structure and secure the holdback assembly to the structure.

18. The holdback assembly of claim 11 wherein the one or more engagement protrusions are separable from the mounting plate.

19. A holdback assembly consisting of:
a holdback portion;
the holdback portion having an open end portion, a coupling portion and a bend portion;
a mounting portion coupled to the bend portion of the holdback portion by a single angular bend;
the mounting portion having a mounting plate having an inward facing surface, an open side surface and one or more engagement protrusions coupled to and extending generally perpendicular from the inward facing surface of the mounting plate;
the inward facing surface of the mounting plate oriented substantially orthogonal to a direction of extension of the holdback portion; and
the inward facing surface is configured to engage a mounting surface whereby the engagement of the inward facing surface with the mounting surface provides a compressive force to counter a force component applied to the holdback portion of the holdback assembly in the direction of the extension of the holdback portion.

20. The holdback assembly of claim 19 wherein:
the one or more engagement protrusions are sharpened protrusions configured to penetrate a mounting surface of a structure and secure the holdback assembly to the structure;
the structure is a side trim of a window;
the mounting surface is the outside side surface of the side trim of the window;
the one or more engagement protrusions extend generally perpendicular from the inward facing surface of the mounting plate;
whereby the holdback assembly can be mounted on the mounting surface without the use of nails; and
whereby the force component is applied by a curtain being held back from covering the window.

* * * * *